July 5, 1949.　　　　G. E. KARL　　　　2,474,980

BEARING STRUCTURE

Filed March 29, 1944

Inventor:
George E. Karl
By: Bair & Freeman
Attorneys

Patented July 5, 1949

2,474,980

UNITED STATES PATENT OFFICE 2,474,980

BEARING STRUCTURE

George E. Karl, Liberty, Ind., assignor to General Implement Corporation, a corporation of Ohio Application March 29, 1944, Serial No. 528,503

5 Claims. (Cl. 308—36)

This invention relates to a bearing structure. An object of the present invention is the provision of a bearing structure which is especially effective for prevention of the entrance thereinto of foreign matter.

The bearing is particularly adaptable to farm implements in which, in working the soil, there is more likelihood of the entrance of foreign matter into the bearings thereof than in most other instances.

Another object of the invention is the provision of a novel closed end bearing.

Still another object is the provision of a novel bearing which maintains adequate lubrication for the axle to which it is applied.

A further object is the provision of a novel bearing effective for taking up end thrust in the axle to which it is applied.

With these and other objects in view, my invention consists in the construction, arrangement and combination of the various parts of my improved implement whereby the objects contemplated are attained, as hereinafter more fully set forth, pointed out in my claims and illustrated in the accompanying drawings, wherein:

Figure 1:
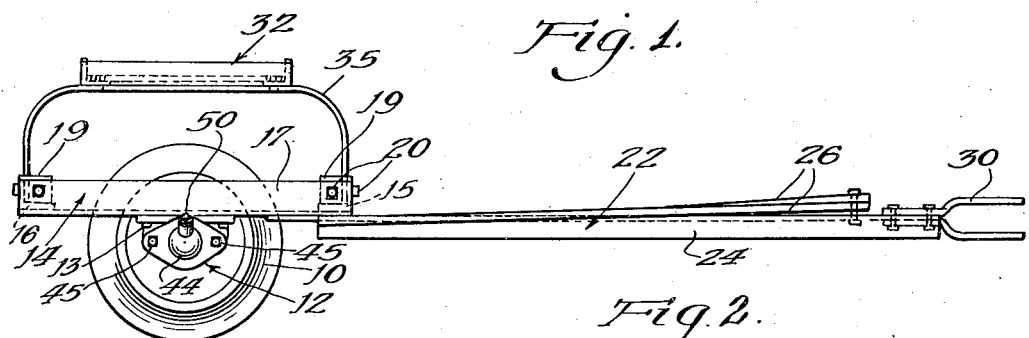
Figure 1 is an end elevational view of a farm implement employing bearings of the present invention.

The implement to which the present invention is applied and as represented in Figure 1 of the drawings is a pulverizer and includes a series of axially spaced apart pulverizer wheels 10, mounted in close spaced apart relation on a horizontal axle 11. The axle is journalled at opposite ends in bearings 12, forming the present invention, which are connected by bolts 13 to the under side of the ends of a rigid main frame 14. The main frame is of generally rectangular form made up of structural angle members, including front, side and rear side members 15, and 16, respectively, and connecting end members 17; said angle members being connected together at the corners by angle clips 19, through the medium of bolts 20.

The main frame is disposed in surrounding relation to the pulverizer wheels 10.

Rigidly connected to the forward side of the main frame 14, is a horizontally extending draw bar 22, comprising a centrally disposed, forwardly extending, inverted structural channel or suitably shaped member 24. Rigidly connected, as by riveting or bolting, to the forward frame member 15, is a pair of oppositely and obliquely extending brace members 26, riveted or bolted at corresponding ends to the outer end portions of the forward frame member 15, and to the respective end members 17. The opposite or converging ends of said members 26 are connected together and rigidly secured by riveting or bolting to the forward end of the draw bar member 24. The extreme forward end of the draw bar member 24 has rigidly bolted thereto a clevis or hitch 30, for connection to a tractor or to a whippletree.

A weight box 32 is mounted on the frame of the vehicle above the wheels 10 by means of bracket members 35. The weight box may be constructed of appropriate structural members.

Figures 2, 3:
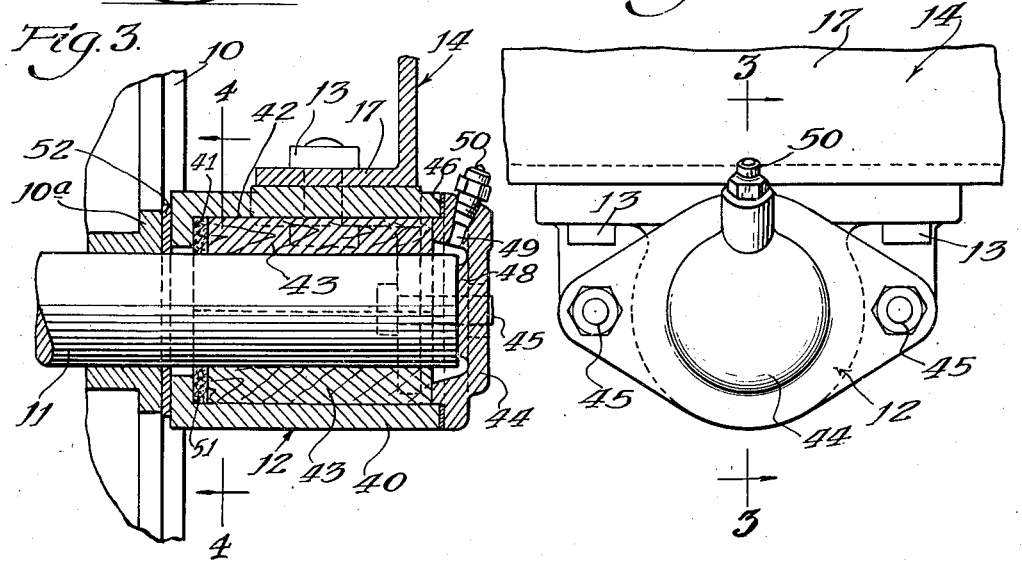
Figure 2 is an enlarged end view of one bearing.
Figure 3 is a sectional view of the bearing, taken on line 3—3 of Figure 2.
Figure 4:
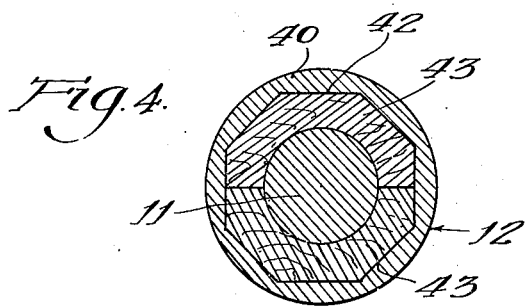
Figure 4 is a sectional view taken on line 4—4 of Figure 3.

The bearings at opposite ends of the axle 11, are disposed in close proximity to the hub portions 10a, of the outermost pulverizer wheels 10, as may be clearly seen in Figure 3 of the drawings. Each of the bearing includes a cast metal shell housing 40, open at its outer end and its inner end terminating in an annular end flange 41. The interior of the housing is formed with a polygonal bore 42, in which is mounted a set of correspondingly shaped bearing blocks 43, preferably formed of hard wood; the bearing blocks being dimensioned to provide a snug journal bearing fit on the ends of the axle 11. The purpose of the polygonal shaped bore and corresponding formation of the exterior of the bearing blocks, is to preclude rotation of the bearing blocks within the bearing housing, while at the same time permitting convenient accommodation for taking up wear which may occur in certain areas of the bearing blocks. This is accomplished by merely removing the bearing blocks and rotating them an amount equal to the angular distance between one or more sets of flat faces of the blocks. The outer end of each of the bearing housings 40 is closed and sealed by a cap member 44, which is adapted to be rigidly attached to the bearing housing by means of bolts 45. Interposed between the cap and the end of the bearing housing is a sealing gasket 46 of any suitable material. The inner surface of the cap is formed to provide a cavity with a centrally located interiorly projecting abutment 48, adapted to engage the end of the axle, and serving to take up end thrusts exerted on the axle. The upper end of the cap 44 is provided with a lubricant passageway 49, opening into the interior of the cap, and the outer end of said passageway is provided with a conventional form of lubricating fitting 50, so that a suitable pressure type of lubricating apparatus may be connected to the fitting for supplying lubricant to the bearing.

Surrounding the axle 11, and disposed in abutting relation to the inner surface of the inner end flange 41 of the bearing housing 40 and the wood bearing blocks 43, is a felt washer 51, and a metal washer 52, is interposed between the exterior of the inner end of the bearing housing and the hub portion 10a of the adjacent pulverizer wheel 10. By virtue of this construction the bearing proper is sealed against the entry of dust, dirt and foreign matter and in addition, serves to retain the lubricant within the bearing proper. Furthermore, the wear on the axle, the bearing, and other parts mounted on the axle is greatly reduced, and serves to prolong the life of usefulness of the implement.

Some changes may be made in the construction and arrangement of the parts of my improved implement without departing from the real spirit and purpose of my invention, and it is my intention to cover by my claims any modified forms of structure or use of mechanical equivalents which may be reasonably included within their scope.

I claim as my invention:

1. A bearing structure for a shaft comprising, a housing formed as an integral body having a chamber open at opposite ends, the inner end having an inwardly extending annular flange, a bearing liner mounted in the chamber of the housing, in registration with the flange, and a cap rigidly secured in sealing engagement with the outer end of the housing for closing the outer end of the chamber, confining the liner therein and serving to take up end thrust of the shaft, said cap having an annular projection on its inner face in engagement with said bearing liner and forming therewith an annular cavity surrounding the end of the shaft, and a lubricant passageway opening at one end to the exterior of the cap and the opposite end opening into said cavity.

2. A bearing structure for a shaft comprising, a housing formed as an integral body having a chamber open at opposite ends, the inner end having an inwardly extending annular flange, a bearing liner mounted in the chamber of the housing, in registration with the flange, a compressible sealing washer positioned intermediate the inner face of the flange and the adjacent end of the liner and adapted to surround the shaft, and a cap rigidly secured in sealing engagement with the outer end of the housing for closing the outer end of the chamber, confining the liner therein and serving to take up end thrust of the shaft, said cap having an annular projection on its inner face in engagement with said bearing liner and forming therewith an annular cavity surrounding the end of the shaft, and a lubricant passageway opening at one end to the exterior of the cap and the opposite end opening into said cavity.

3. A bearing structure for a shaft comprising a housing formed as an integral body having a chamber open at opposite ends, the inner end having a radially, inwardly extending annular flange, the inner surface of said housing being polygonal in transverse cross section, a bearing liner mounted in the chamber of the housing, the outer surface of said bearing liner being shaped to conform with the polygonal inner surface of the housing, said bearing liner being in registration with said flange and extending radially, inwardly beyond said flange, and a cap rigidly secured in sealing engagement with the outer end of the housing for closing the outer end of the chamber, said cap having a central projection on its inner surface adapted to receive end thrust of the shaft, said cap having an annular projection surrounding and spaced radially from said central projection and extending radially, inwardly therebeyond, said annular projection being in engagement with said bearing liner and forming therewith an annular cavity surrounding the end of the shaft.

4. A bearing structure for a shaft comprising, a housing formed as an integral body having a chamber open at opposite ends, the inner end having a radially, inwardly extending annular flange, the inner surface of said housing being polygonal in transverse cross section, a bearing liner mounted in the chamber of the housing, the outer surface of said bearing liner being shaped to conform with the polygonal inner surface of the housing, said bearing liner being in registration with said flange and extending radially, inwardly beyond said flange, a compressible sealing washer positioned between the inner face of the flange and the adjacent end of the liner, a cap secured to the outer end of the housing, said cap having a peripheral sealing surface, a compressible washer positioned between said peripheral sealing surface and the end of the housing, said cap having a central projection on its inner surface adapted to receive end thrust from the shaft, said cap having an annular projection on its inner surface surrounding and spaced radially from said central projection, said annular projection extending axially, inwardly beyond said central projection and said sealing surface, said annular projection being in engagement with said bearing liner and forming therewith an annular cavity surrounding the end of the shaft, and a lubricant passageway through said cap communicating with said cavity.

5. A bearing structure for a shaft comprising, a housing formed as an integral body having a chamber open at opposite ends, said housing having radially extending ears for mounting the bearing structure, the inner end having a radially, inwardly extending annular flange, the inner surface of said housing being polygonal in transverse cross section, a bearing liner mounted in the chamber of the housing, the outer surface of said bearing liner being shaped to conform with the polygonal inner surface of the housing, said bearing liner being in registration with said flange and extending radially, inwardly beyond said flange, a compressible sealing washer positioned between the inner face of the flange and the adjacent end of the liner, and a cap closing the outer end of the housing, said cap having radial ears for receiving connecting means for securing themselves to the ears on said housing and mounting the cap in place, said cap having a peripheral sealing surface, a compressible washer positioned between said peripheral sealing surface and the end of the housing, said cap having an annular projection on its inner surface surrounding and spaced radially from said central projection, said annular projection extending axially, inwardly beyond said central projection and said sealing surface, said annular projection being in engagement with said bearing liner and forming therewith an annular cavity surrounding the end of the shaft, and a lubricant passageway through said cap communicating with said cavity.

GEORGE E. KARL.

REFERENCES CITED

The following references are of record in the file of this patent:

UNITED STATES PATENTS

| Number | Name | Date |
|---|---|---|
| 296,554 | Godfrey | Apr. 5, 1884 |
| 450,514 | Johnson | Apr. 14, 1891 |
| 775,906 | Kopperud | Nov. 22, 1904 |
| 1,534,762 | Bostick | Apr. 21, 1925 |
| 1,554,207 | Fincher | Sept. 22, 1925 |
| 1,604,567 | Dick | Oct. 26, 1926 |
| 1,829,605 | Nordstrom | Oct. 27, 1931 |
| 1,885,410 | Brenneis | Nov. 1, 1932 |
| 2,271,741 | Mansfield | Feb. 3, 1943 |